(12) United States Patent
Lee et al.

(10) Patent No.: US 10,871,690 B2
(45) Date of Patent: Dec. 22, 2020

(54) DISPLAY DEVICE

(71) Applicant: SAMSUNG DISPLAY CO., LTD., Yongin-si, Gyeonggi-do (KR)

(72) Inventors: Whee-Won Lee, Busan (KR); Ga-Na Kim, Icheon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/460,184

(22) Filed: Jul. 2, 2019

(65) Prior Publication Data

US 2019/0324336 A1 Oct. 24, 2019

Related U.S. Application Data

(62) Division of application No. 15/647,564, filed on Jul. 12, 2017, now Pat. No. 10,372,002.

(30) Foreign Application Priority Data

Aug. 30, 2016 (KR) ........................ 10-2016-0110813

(51) Int. Cl.
G02F 1/13 (2006.01)
G02F 1/1362 (2006.01)
(Continued)

(52) U.S. Cl.
CPC ........ *G02F 1/136286* (2013.01); *G02F 1/133* (2013.01); *G09G 3/20* (2013.01);
(Continued)

(58) Field of Classification Search
CPC . G02F 1/136286; G02F 1/133; G09G 3/3677; G09G 3/3266; G09G 3/3607;
(Continued)

(56) References Cited

U.S. PATENT DOCUMENTS 8,957,882 B2    2/2015  Lee et al.
9,892,706 B2 *  2/2018  Ishii ..................... G09G 3/3696
                        (Continued)

FOREIGN PATENT DOCUMENTS

KR    20080024755 A  *  3/2008

*Primary Examiner* — Charles D Garber
*Assistant Examiner* — S M Sohel Imtiaz
(74) *Attorney, Agent, or Firm* — F. Chau & Associates, LLC

(57) ABSTRACT

A display device includes: pixels; gate lines for connecting to the pixels; a first gate driving block for connecting to first and second gate lines that are adjacent to each other; and a second gate driving block for connecting to the first gate line and the second gate line, wherein the first gate driving block includes: a first gate signal generating portion; a first transistor connected between a first output terminal of the first gate signal generating portion and the first gate line; and a second transistor connected between the first output terminal and the second gate line, wherein the second gate driving block includes: a second gate signal generating portion; a third transistor connected between a second output terminal of the second gate signal generating portion and the first gate line; and a fourth transistor connected between the second output terminal and the second gate line.

7 Claims, 9 Drawing Sheets

(51) Int. Cl.
*G09G 3/3266* (2016.01)
*G09G 3/36* (2006.01)
*G09G 3/20* (2006.01)
*G02F 1/133* (2006.01)
*G09G 3/3208* (2016.01)

(52) U.S. Cl.
CPC ......... *G09G 3/3208* (2013.01); *G09G 3/3266* (2013.01); *G09G 3/36* (2013.01); *G09G 3/3607* (2013.01); *G09G 3/3677* (2013.01); *G09G 3/3611* (2013.01); *G09G 2300/0408* (2013.01); *G09G 2320/0223* (2013.01)

(58) Field of Classification Search
CPC ......... G09G 3/3208; G09G 2320/0223; G09G 2300/0408; G09G 3/3611; G09G 3/20
See application file for complete search history.

(56) References Cited

U.S. PATENT DOCUMENTS

| | | | | |
|---|---|---|---|---|
| 2001/0022565 A1* | 9/2001 | Kimura | ................ | G09G 3/3266 345/82 |
| 2005/0243044 A1* | 11/2005 | Kang | ................ | G09G 3/3614 345/87 |
| 2005/0275614 A1* | 12/2005 | Kim | ................ | G09G 3/3674 345/100 |
| 2007/0146289 A1* | 6/2007 | Lee | ................ | G09G 3/3677 345/100 |
| 2008/0191980 A1* | 8/2008 | Jeon | ................ | G09G 3/3677 345/87 |
| 2008/0211760 A1* | 9/2008 | Baek | ................ | G11C 19/184 345/98 |
| 2009/0102764 A1* | 4/2009 | Chen | ................ | H04N 13/398 345/87 |
| 2010/0134396 A1* | 6/2010 | Umezaki | ................ | G09G 3/3413 345/92 |
| 2012/0162168 A1* | 6/2012 | Ku | ................ | G09G 3/2003 345/207 |
| 2014/0146026 A1* | 5/2014 | Yu | ................ | G09G 3/3677 345/208 |
| 2014/0176622 A1* | 6/2014 | Jung | ................ | G09G 3/3208 345/690 |
| 2015/0055047 A1* | 2/2015 | Chang | ................ | H01L 27/1225 349/43 |
| 2015/0116385 A1* | 4/2015 | Lee | ................ | G09G 3/3659 345/694 |
| 2015/0188431 A1* | 7/2015 | Cho | ................ | G09G 3/2003 345/212 |
| 2015/0194116 A1 | 7/2015 | Lee et al. | | |
| 2015/0194121 A1* | 7/2015 | Lee | ................ | G09G 3/3677 345/212 |
| 2015/0213775 A1* | 7/2015 | Lee | ................ | G09G 3/3611 345/212 |
| 2015/0243220 A1* | 8/2015 | Kim | ................ | H01L 27/1222 345/215 |
| 2016/0163264 A1* | 6/2016 | Nishimura | ................ | G09G 3/3266 345/212 |
| 2016/0240565 A1* | 8/2016 | Kim | ................ | G09G 3/3233 |
| 2016/0275888 A1* | 9/2016 | Chen | ................ | G09G 3/3225 |
| 2017/0039962 A1* | 2/2017 | Yamakawa | ................ | G09G 3/36 |
| 2017/0229054 A1* | 8/2017 | Li | ................ | G09G 3/2092 |
| 2017/0278473 A1* | 9/2017 | Shang | ................ | G11C 19/28 |
| 2018/0059497 A1 | 3/2018 | Lee et al. | | |

\* cited by examiner

DISPLAY DEVICE

CROSS-REFERENCE TO RELATED APPLICATIONS

This application is a divisional of U.S. patent application Ser. No. 15/647,564 filed Jul. 12, 2017, which claims priority under 35 U.S.C. § 119 to Korean Patent Application No. 10-2016-0110813 filed in the Korean Intellectual Property Office on Aug. 30, 2016, the disclosures of which are incorporated by reference herein in their entireties.

TECHNICAL FIELD

The present invention relates to a display device. More particularly, the present invention relates to a display device including a gate driving block.

DESCRIPTION OF THE RELATED ART

Liquid crystal displays, organic light emitting diode displays, and the like include a plurality of pixels for displaying an image. The plurality of pixels are arranged in a matrix, and are connected to a plurality of gate lines extending in a row direction and to a plurality of data lines extending in a column direction. An individual pixel receives a gate signal applied through a gate line, and a data signal applied through a data line. The data signal is synchronized with a time that the gate signal is transmitted, and then, it is applied.

Liquid crystal displays, organic light emitting diode displays, and the like include a display area and a non-display area. The plurality of pixels are arranged in the display area and the non-display area is disposed around the display area. A gate circuit for applying the gate signals to the plurality of gate lines is positioned in the non-display area. Methods for minimizing the non-display area of the display device have been researched. In one method, the gate circuit is divided and positioned in non-display areas at opposite sides of the display area.

However, when the gate circuit is divided and disposed in the non-display areas at the opposite sides of the display area, a charge rate of the plurality of pixels may vary.

SUMMARY

An exemplary embodiment of the present invention provides a display device including: a plurality of pixels; a plurality of gate lines configured to be connected to the plurality of pixels; a first gate driving block configured to be connected to a first gate line and a second gate line of the plurality of gate lines, wherein the first and second gate lines are adjacent to each other; and a second gate driving block configured to be connected to the first gate line and the second gate line, wherein the first gate driving block may include: a first gate signal generating portion; a first switching transistor connected between a first output terminal of the first gate signal generating portion and the first gate line; and a second switching transistor connected between the first output terminal and the second gate line, and wherein the second gate driving block may include: a second gate signal generating portion; a third switching transistor connected between a second output terminal of the second gate signal generating portion and the first gate line; and a fourth switching transistor connected between the second output terminal and the second gate line.

The first switching transistor may be the same type as that of the fourth switching transistor, and the second switching transistor may be a different type from that of the first switching transistor and may be the same type as that of the third switching transistor.

A first switching signal may be applied to a gate electrode of each of the first to fourth switching transistors.

A voltage level of the first switching signal may be different in consecutive frames.

The first to fourth switching transistors may be the same type.

The first switching signal may be applied to a gate electrode of each of the first switching transistor and the fourth switching transistor, and a second switching signal having a voltage level of an opposite phase to that of the first switching signal may be applied to a gate electrode of each of the second switching transistor and the third switching transistor.

A voltage level of the first switching signal may vary for consecutive frames, and a voltage level of the second switching signal may have an opposite phase to that of the first switching signal for the consecutive frames.

The first gate signal generating portion may include an output portion configured to output a gate signal to the first output terminal according to a voltage of a first node and a clock signal received by a clock terminal, and a transmission signal generating portion configured to output a transmission signal to a transmission signal output terminal according to the voltage of the first node and the clock signal, wherein the transmission signal is transmitted to another first gate signal generating portion.

The first gate signal generating portion may further include a pull-down driver configured to transmit a first low voltage to the first output terminal and to transmit a second low voltage lower than the first low voltage to the transmission signal output terminal.

The first gate signal generating portion may further include a pull-up driver configured to transmit the clock signal to a second node.

The pull-down driver may include a transistor that transmits the second low voltage to the transmission signal output terminal according to a voltage of the second node.

The first gate signal generating portion may further include an input portion that transmits a signal received by an input terminal connected to an output terminal of the another first gate signal generating portion to the first node.

An exemplary embodiment of the present invention provides a display device including: a display unit including a plurality of pixels; a plurality of gate lines configured to be connected to the plurality of pixels; a first gate driver configured to be connected to the plurality of gate lines; and a second gate driver configured to be connected to the plurality of gate lines connected to the first gate driver, wherein the first gate driver may apply a first gate signal to odd-numbered gate lines of the plurality of gate lines in a first frame, and may apply the first gate signal to even-numbered gate lines of the plurality of gate lines in a second frame after the first frame, and the second gate driver may apply a second gate signal to the even-numbered gate lines in the first frame, and may apply the second gate signal to the odd-numbered gate lines in the second frame.

The display unit may be disposed between the first gate driver and the second gate driver.

The first gate signal and the second gate signal may be alternately applied to the plurality of gate lines.

An interval in which the first gate signal is applied to the plurality of gate lines and an interval in which the second gate signal is applied to the plurality of gate lines may overlap each other after a predetermined delay time.

The display device may further include a plurality of data lines configured to be connected to the plurality of pixels, wherein two of the plurality of gate lines may be arranged in each pixel row, a first data line of the plurality of data lines may be connected to a first two pixel pair in a first pixel column, and a second data line of the plurality of data lines may be connected to a second two pixel pair in the first pixel column. The first and second two pixel pairs may be positioned in adjacent pixel rows.

An exemplary embodiment of the present invention provides a display device including: a first gate driving block configured to be connected to first and second gate lines; a second gate driving block configured to be connected to the first and second gate lines, wherein the second gate driving block is separated from the first gate driving block by a plurality of pixels, wherein a first gate signal applied to the first gate line is applied in a direction from the first gate driving block to the second gate driving block for a first frame, and a third gate signal applied to the first gate line is applied in a direction from the second gate driving block to the first gate driving block for a second frame subsequent to the first frame.

The first gate driving block may include a first gate signal generating portion for outputting the first gate signal to the first gate line through a turned-on first switching transistor for the first frame, and the second gate driving block may include a second gate signal generating portion for outputting a fourth gate signal to a second gate line through a turned-on fourth transistor for the first frame.

The first gate signal generating portion may output a second gate signal to the second gate line through a turned-on second transistor for the second frame, and the second gate signal generating portion may output the third gate signal to the first gate line through a turned-on third transistor for the second frame.

DETAILED DESCRIPTION OF THE EMBODIMENTS

Figure 1:
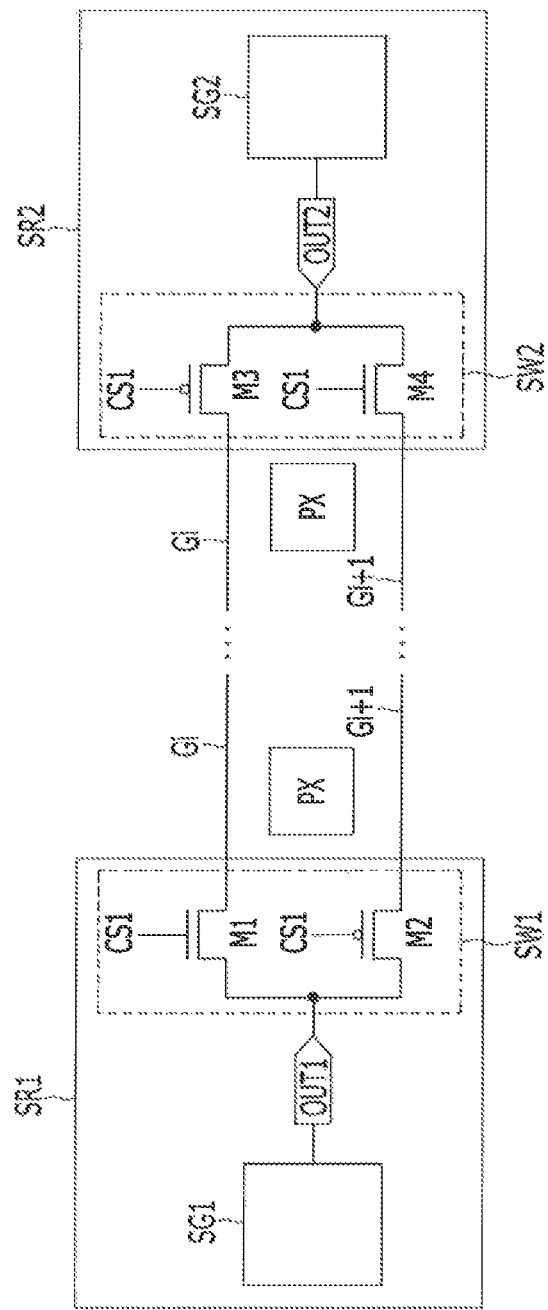
FIG. 1 illustrates a schematic view of a gate driving block according to an exemplary embodiment of the present invention.

Exemplary embodiments of the present invention will be described more fully hereinafter with reference to the accompanying drawings. As those skilled in the art would realize, the described embodiments may be modified in various different ways, and thus, should not be construed as being limited to the embodiments set forth herein.

Like reference numerals may designate like elements throughout the specification.

Hereinafter, a gate driving block according to an exemplary embodiment of the present invention will be described in detail with reference to FIG. 1. In particular, two gate driving blocks positioned at opposite sides of a display unit including a plurality of pixels will be described. It is to be understood, however, that the illustrated gate driving blocks are among a plurality of gate driving blocks included in a gate driver of a display device. The display device will be described later with reference to FIG. 3.

FIG. 1 illustrates a schematic view of a gate driving block according to an exemplary embodiment of the present invention.

Referring to FIG. 1, a first gate line Gi and a second gate line Gi+1 connected to a plurality of pixels PX extend in a first direction, and they are substantially parallel to each other. The first gate line Gi and the second gate line Gi+1 are two of a plurality of gate lines included in a display device. The first gate line Gi and the second gate line Gi+1 are adjacent to each other in a second direction. The first direction is a row direction, and the second direction is a column direction, for example.

A first gate driving block SR1 may be positioned at one side (e.g., a first side) of the first gate line Gi and the second gate line Gi+1. The first gate driving block SR1 may be connected to the first gate line Gi and the second gate line Gi+1.

A second gate driving block SR2 may be positioned at the other side (e.g., a second side) of the first gate line Gi and the second gate line Gi+1. The second gate driving block SR2 is connected to the first gate line Gi and the second gate line Gi+1. The second gate driving block SR2 may face the first gate driving block SR1 with the plurality of pixels PX therebetween.

The first gate driving block SR1 includes a first gate signal generating portion SG1 and a first switching portion SW1 connected to a first output terminal OUT1 of the first gate signal generating portion SG1. The first switching portion SW1 includes a first switching transistor M1 and a second switching transistor M2.

The first gate signal generating portion SG1 may receive at least one clock signal, and the first gate signal generating portion SG1 may be synchronized with at least one clock signal to generate a first gate signal.

The first switching transistor M1 is connected between the first output terminal OUT1 of the first gate signal generating portion SG1 and the first gate line Gi. The first switching transistor M1 includes a gate electrode to which a first switching signal CS1 is applied, a first electrode connected to the first output terminal OUT1 of the first gate signal generating portion SG1, and a second electrode connected to the first gate line Gi.

The second switching transistor M2 is connected between the first output terminal OUT1 of the first gate signal generating portion SG1 and the second gate line Gi+1. The second switching transistor M2 includes a gate electrode to which the first switching signal CS1 is applied, a first electrode connected to the first output terminal OUT1 of the first gate signal generating portion SG1, and a second electrode connected to the second gate line Gi+1.

The second gate driving block SR2 includes a second gate signal generating portion SG2, and a second switching portion SW2 connected to a second output terminal OUT2 of the second gate signal generating portion SG2. The second switching portion SW2 includes a third switching transistor M3 and a fourth switching transistor M4.

The second gate signal generating portion SG2 may receive at least one clock signal, and the second gate signal generating portion SG2 may be synchronized with at least one clock signal to generate a second gate signal. The clock signal received by the second gate signal generating portion SG2 may be a clock signal having a different waveform from that of the clock signal received by the first gate signal generating portion SG1.

The third switching transistor M3 is connected between the second output terminal OUT2 of the second gate signal generating portion SG2 and the first gate line Gi. The third switching transistor M3 includes a gate electrode to which the first switching signal CS1 is applied, a first electrode connected to the second output terminal OUT2 of the second gate signal generating portion SG2, and a second electrode connected to the first gate line Gi.

The fourth switching transistor M4 is connected between the second output terminal OUT2 of the second gate signal generating portion SG2 and the second gate line Gi+1. The fourth switching transistor M4 includes a gate electrode to which the first switching signal CS1 is applied, a first electrode connected to the second output terminal OUT2 of the second gate signal generating portion SG2, and a second electrode connected to the second gate line Gi+1.

The first switching transistor M1 and the fourth switching transistor M4 may be of the same type. The second switching transistor M2 may be of a different type from that of the first switching transistor M1, and the second switching transistor M2 may be of the same type as that of the third switching transistor M3. In other words, the first switching transistor M1 may be of a different type from that of the third switching transistor M3, and the second switching transistor M2 may be of a different type from that of the fourth switching transistor M4.

For example, as shown in FIG. 1, the first switching transistor M1 and the fourth switching transistor M4 may be N-channel electric field effect transistors, and the second switching transistor M2 and the third switching transistor M3 may be P-channel electric field effect transistors. A gate-on voltage for turning on the N-channel electric field effect transistor is a high level voltage, and a gate-off voltage for turning off the N-channel electric field effect transistor is a low level voltage. A gate-on voltage for turning on the P-channel electric field effect transistor is a low level voltage, and a gate-off voltage for turning off the P-channel electric field effect transistor is a high level voltage.

It is to be understood that the first switching transistor M1 and the fourth switching transistor M4 may be N-channel electric field effect transistors, and the second switching transistor M2 and the third switching transistor M3 may be P-channel electric field effect transistors.

Hereinafter, a case in which the first switching transistor M and the fourth switching transistor M4 are N-channel electric field effect transistors and the second switching transistor M2 and the third switching transistor M3 are P-channel electric field effect transistors will be described as an example.

Since the first switching signal CS1 is applied to each gate electrode of the first to fourth switching transistors (M1, M2, M3, and M4), when the first switching transistor M1 and the fourth switching transistor M4 are turned on, the second switching transistor M2 and the third switching transistor M3 are turned off. When the second switching transistor M2 and the third switching transistor M3 are turned on, the first switching transistor M1 and the fourth switching transistor M4 are turned off.

A voltage level of the first switching signal CS1 may vary for each frame. For example, the first switching signal CS1 may have a high level voltage for one frame, and the first switching signal CS1 may have a low level voltage for a subsequent frame. The first switching signal CS1 may be a frame polarity signal whose voltage level varies for each frame.

As the voltage level of the first switching signal CS1 varies for each frame, the first switching transistor M1 and the fourth switching transistor M4 may be turned on and the second switching transistor M2 and the third switching transistor M3 may be turned off, for one frame. In addition, the second switching transistor M2 and the third switching transistor M3 may be turned on and the first switching transistor M1 and the fourth switching transistor M4 may be turned off, for a subsequent frame.

Accordingly, the first gate signal outputted from the first gate signal generating portion SG1 in one frame (e.g., a first frame) may be applied to the first gate line Gi through the turned-on first switching transistor M1, and the second gate signal outputted from the second gate signal generating portion SG2 in one frame (e.g., the first frame) may be applied to the second gate line Gi+1 through the turned-on fourth switching transistor M4. In addition, the first gate signal outputted from the first gate signal generating portion SG1 in a subsequent frame (e.g., a second frame) may be applied to the second gate line Gi+1 through the turned-on second switching transistor M2, and the second gate signal outputted from the second gate signal generating portion SG2 in the subsequent frame (e.g., the second frame) may be applied to the first gate line Gi through the turned-on third switching transistor M3.

Accordingly, a direction in which a gate signal is applied to one gate line Gi may vary for each frame. In other words, the gate signal applied to the first gate line Gi may be applied in a direction proceeding from the first gate driving block SR1 towards the second gate driving block SR2 for one frame. In addition, the gate signal applied to the first gate line Gi may be applied in a direction proceeding from the second gate driving block SR2 toward the first gate driving block SR1 for a subsequent frame.

In this case, by changing each output timing of the clock signal applied to the first gate signal generating portion SG1 and the clock signal applied to the second gate signal generating portion SG2 for each frame, it possible to allow the gate signal to always be applied to the first gate line Gi prior to the second gate line Gi+1 for each frame.

For example, when the first switching signal CS1 of the high level voltage is applied for one frame, the first gate signal generating portion SG1 may be synchronized with one clock signal (e.g., a first clock) to apply the first gate signal to the first gate line Gi. Additionally, the second gate signal generating portion SG2 may be synchronized with another clock signal (e.g., a second clock) that is delayed by a predetermined delay time from the one clock signal (e.g., the first clock) to apply the second gate signal to the second gate line Gi+1. Then, for a subsequent frame, one clock signal is changed to be delayed by a predetermined delay time from another clock signal and output. When the first switching signal CS1 of the low level voltage is applied for the subsequent frame, the second gate signal generating portion SG2 may be synchronized with another clock signal to apply the second gate signal to the first gate line Gi. Additionally, the first gate signal generating portion SG1 may be synchronized with one clock signal that is delayed by a predetermined delay time from another clock signal to apply the first gate signal to the second gate line Gi+1. The clock signal repeatedly varies to have a high level voltage or a low level voltage for a predetermined period. Here, the delay time may correspond to about half of a time for which the clock signal of the high level voltage or the low level voltage is applied.

As such, the first gate driving block SR1 and the second gate driving block SR2 may alternately apply the gate signal to different gate lines for each frame, and thus, it is possible to allow the gate signal to be applied to the first gate line Gi prior to the second gate line Gi+1.

Hereinafter, a gate driving block according to an exemplary embodiment of the present invention will be described with reference to FIG. 2. Compared with FIG. 1, differences will be mainly described.

Figure 2:
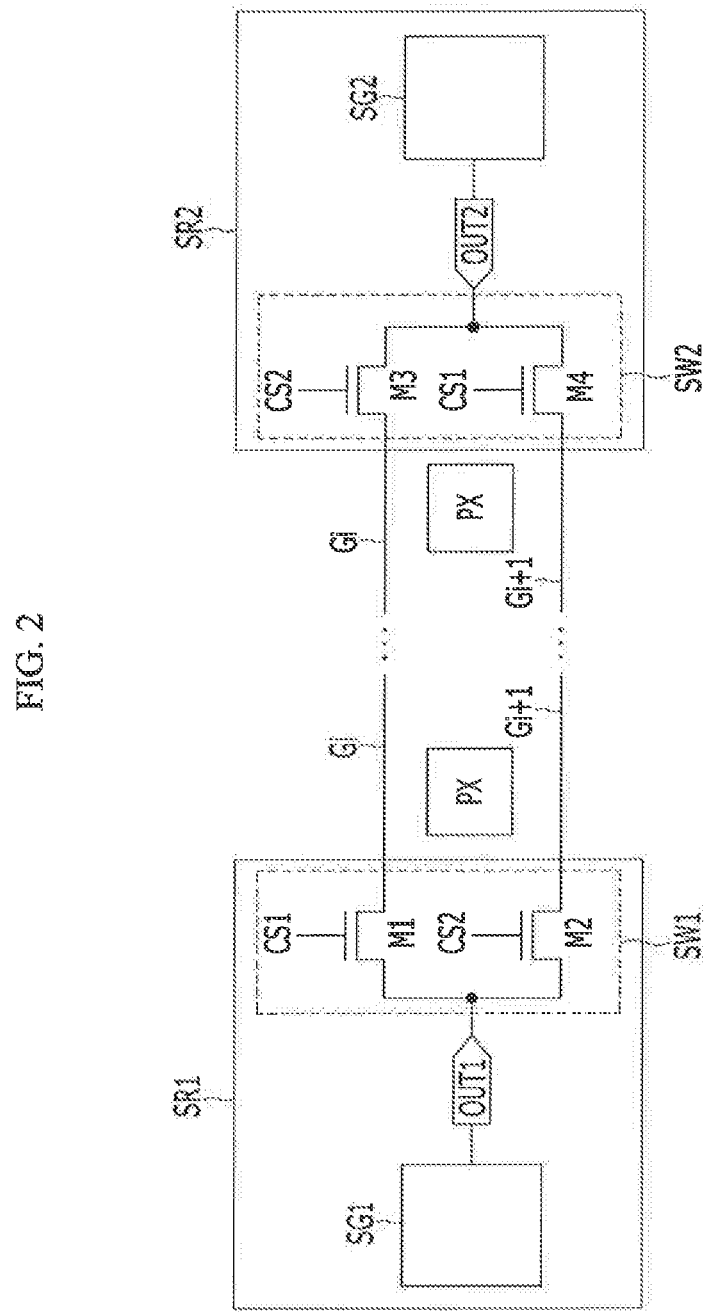
FIG. 2 illustrates a schematic view of a gate driving block according to an exemplary embodiment of the present invention.

FIG. 2 illustrates a schematic view of a gate driving block according to an exemplary embodiment of the present invention.

Referring to FIG. 2, the first switching portion SW1 includes the first switching transistor M1 and the second switching transistor M2 of the same type. The second switching portion SW2 includes the third switching transistor M3 and the fourth switching transistor M4 of the same type. The first to fourth switching transistors (M1, M2, M3, and M4) may be transistors of the same type.

For example, as illustrated in FIG. 2, the first to fourth switching transistors (M1, M2, M3, and M4) may be N-channel electric field effect transistors. However, the first to fourth switching transistors (M1, M2, M3, and M4) may be P-channel electric field effect transistors. Hereinafter, a case in which the first to fourth switching transistors (M1, M2, M3, and M4) are the N-channel electric field effect transistors will be described as an example.

The first switching transistor M1 includes the gate electrode to which the first switching signal CS1 is applied, the first electrode connected to the first output terminal OUT1, and the second electrode connected to the first gate line Gi.

The second switching transistor M2 includes a gate electrode to which a second switching signal CS2 is applied, a first electrode connected to the first output terminal OUT1, and a second electrode connected to the second gate line Gi+1.

The third switching transistor M3 includes a gate electrode to which the second switching signal CS2 is applied, a first electrode connected to the second output terminal OUT2, and a second electrode connected to the first gate line Gi.

The fourth switching transistor M4 includes the gate electrode to which the first switching signal CS1 is applied, the first electrode connected to the second output terminal OUT2, and the second electrode connected to the second gate line Gi+1.

The second switching signal CS2 may be a signal having a voltage level of an opposite phase to that of the first switching signal CS1. The first switching signal CS1 may be a signal whose voltage level varies for each frame, and the second switching signal CS2 may be a signal that has an opposite phase to that of the first switching signal CS1 for each frame. For example, the first switching signal CS1 may be a frame polarity signal whose voltage level varies for each frame, and the second switching signal CS2 may be an inverted signal of the frame polarity signal.

Since the first switching signal CS1 is applied to each gate electrode of the first and fourth switching transistors M1 and M4 and the second switching signal CS2 is applied to each gate electrode of the second and third switching transistors M2 and M3, when the first switching transistor M1 and the fourth switching transistor M4 are turned on, the second switching transistor M2 and the third switching transistor M3 are turned off. In addition, when the second switching transistor M2 and the third switching transistor M3 are turned on, the first switching transistor M1 and the fourth switching transistor M4 are turned off.

During one frame (e.g., a first frame), when the first switching signal CS1 of a high level voltage is applied and the second switching signal CS2 of a low level voltage is applied, the first switching transistor M1 and the fourth switching transistor M4 may be turned on, and the second switching transistor M2 and the third switching transistor M3 may be turned off. During a subsequent frame (e.g., a second frame), when the first switching signal CS1 of a low level voltage is applied and the second switching signal CS2 of a high level voltage is applied, the second switching transistor M2 and the third switching transistor M3 may be turned on, and the first switching transistor M1 and the fourth switching transistor M4 may be turned off.

Accordingly, the first gate signal outputted from the first gate signal generating portion SG1 in the one frame (e.g., the first frame) may be applied to the first gate line Gi through the turned-on first switching transistor M1, and the second gate signal outputted from the second gate signal generating portion SG2 in the one frame (e.g., the first frame) may be applied to the second gate line Gi+1 through the turned-on fourth switching transistor M4. In addition, the first gate signal outputted from the first gate signal generating portion SG1 in the subsequent frame (e.g., the second frame) may be applied to the second gate line Gi+1 through the turned-on second switching transistor M2, and the second gate signal outputted from the second gate signal generating portion SG2 in the subsequent frame (e.g., the second frame) may be applied to the first gate line Gi through the turned-on third switching transistor M3.

The above-described features of elements of FIG. 1 may be applied to corresponding elements of FIG. 2.

Hereinafter, a display device to which the gate driving block according to the exemplary embodiments of the present invention shown in FIG. 1 and FIG. 2 are applicable will be described with reference to FIG. 3 to FIG. 9.

Figure 3:
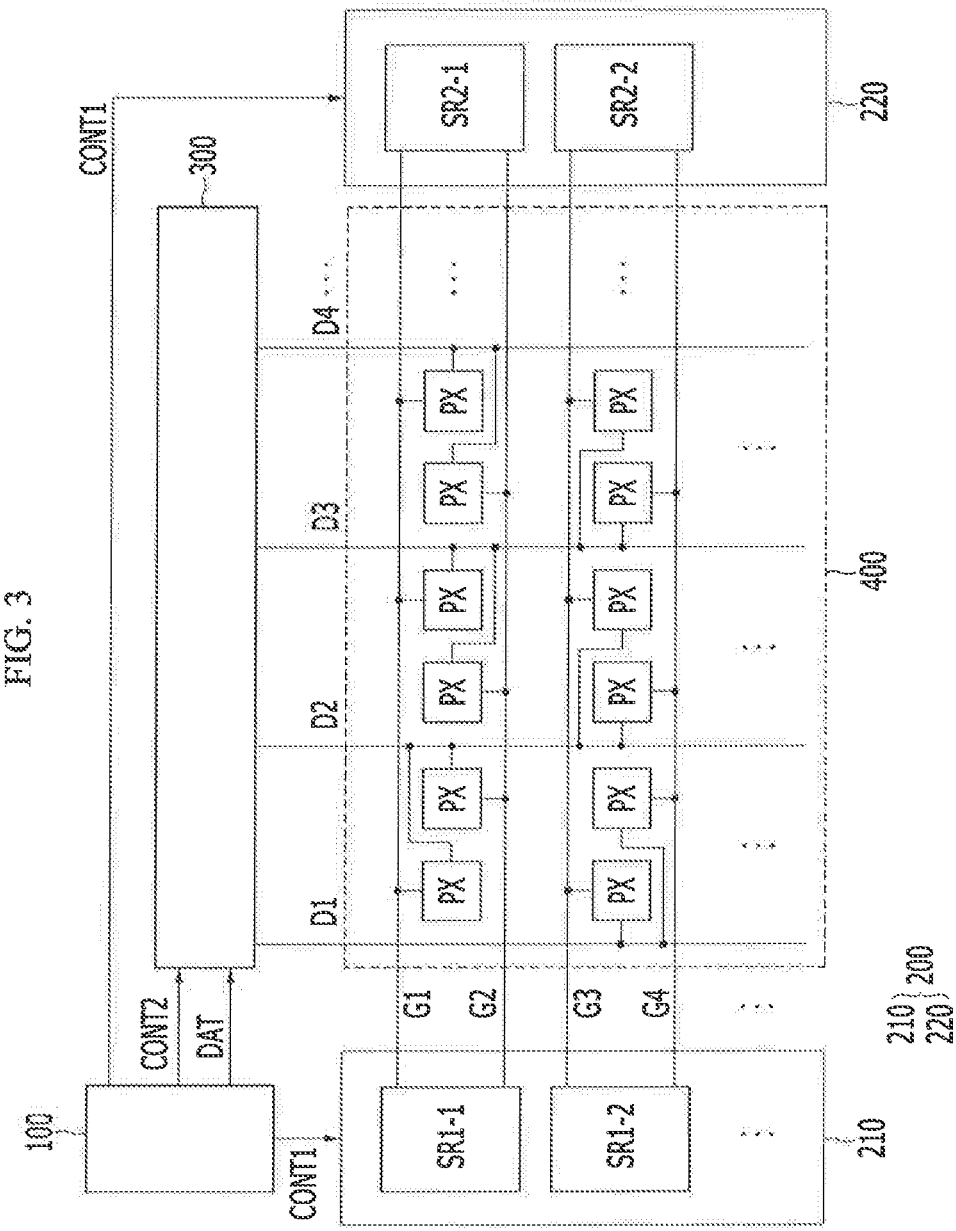
FIG. 3 illustrates a schematic view of a display device according to an exemplary embodiment of the present invention.

FIG. 3 illustrates a schematic view of a display device according to an exemplary embodiment of the present invention.

Referring to FIG. 3, the display device includes a timing controller 100, a gate driver 200, a data driver 300, and a display unit 400.

The timing controller 100 receives an image signal inputted from an external device and an input control signal for controlling the display of the image signal. The image signal includes luminance information of each of the plurality of pixels PX. The luminance may have a predetermined number of gray levels, for example, $1024=2^{10}$, $256=2^8$, or $64=2^6$ gray levels. The input control signal may include a vertical synchronization signal, a horizontal synchronization signal, a main clock signal, a data enable signal, and the like.

The timing controller 100 controls the image signal to be suitable for operating conditions of the display unit 400 and the data driver 300 based on the input image signal and the input control signal. The timing controller 100 generates a gate control signal CONT1, a data control signal CONT2, and an image data signal DAT. The timing controller 100 transmits the gate control signal CONT1 to the gate driver 200. The timing controller 100 transmits the data control signal CONT2 and the image data signal DAT to the data driver 300.

The display unit 400 includes a plurality of gate lines (G1, G2, G3, G4, . . . ), a plurality of data lines (D1, D2, D3, D4, . . . ), and the plurality of pixels PX arranged to have a matrix like shape. The plurality of gate lines (G1, G2, G3, G4, . . . ) extend in a row like direction to be substantially parallel to each other. The plurality of data lines (D1, D2, D3, D4, . . . ) extend in a column like direction to be substantially parallel to each other.

Each of the plurality of pixels PX is connected to one gate line and one data line. For example, as illustrated in FIG. 3, two gate lines are arranged in each pixel row, and the plurality of pixels PX arranged in one pixel row may be connected to one of two adjacent gate lines. In addition, one data line is connected to every other two pixel PX pair in a column. For example, of the plurality of pixels PX positioned in the same pixel column, one two pixel pair PX is connected to a first data line and another two pixel pair PX of an adjacent pixel row is connected to a second data line. A pixel PX positioned in a first one of a plurality of pixel columns may be a red pixel, a pixel PX positioned in a second one of the plurality of pixel columns may be a green pixel, and a pixel PX positioned in a third one of the plurality of pixel columns may be a blue pixel.

The display unit 400 illustrated in FIG. 3 is merely an example, and thus, the arrangement of the plurality of gate lines (G1, G2, G3, G4, . . . ), the plurality of data lines (D1, D2, D3, D4, . . . ), and the plurality of pixels PX in the display unit 400 may be variously changed. In other words, the present invention is not limited to the illustrated display unit 400.

The gate driver 200 includes a first gate driver 210 and a second gate driver 220. The first gate driver 210 may be positioned at one side of the display unit 400 to be connected to the plurality of gate lines (G1, G2, G3, G4, . . . ). The second gate driver 220 may be positioned at another side of the display unit 400 to be connected to the plurality of gate lines (G1, G2, G3, G4, . . . ). The first gate driver 210 and the second gate driver 220 may be connected to each other with the display unit 400 therebetween. For example, the first and second gate drivers 210 and 220 may be connected via the pixels PX.

The first gate driver 210 and the second gate driver 220 may apply a gate signal formed as a combination of a gate-on voltage and a gate-off voltage according to the gate control signal CONT1 to the plurality of gate lines (G1, G2, G3, G4, . . . ). The gate control signal CONT1 may include the first switching signal CS1 and the second switching signal CS2 described in reference to FIG. 1 and FIG. 2, gate start signals (STVP1 and STVP2) and clock signals (CKV1, CKVB1, CKV2, and CKVB2) to be described in reference to FIG. 4 and FIG. 5 later, and the like.

The first gate driver 210 includes a plurality of first gate driving blocks (SR1-1, SR1-2, . . . ). Each of the plurality of first gate driving blocks (SR1-1, SR1-2, . . . ) may be the first gate driving block SR1 described in reference to FIG. 1 or FIG. 2.

The second gate driver 220 includes a plurality of second gate driving blocks (SR2-1, SR2-2, . . . ). Each of the plurality of second gate driving blocks (SR2-1, SR2-2, . . . ) may be the second gate driving block SR2 described in reference to FIG. 1 or FIG. 2.

The first gate driver 210 and the second gate driver 220 may alternately apply the gate signal to different gate lines (G1, G2, G3, G4, . . . ) for each frame. Accordingly, a direction in which the gate signal is applied may vary for each frame.

For example, in one frame, the first gate driver 210 may apply the gate signal of the gate-on voltage to odd-numbered gate lines (G1, G3 . . . ), and the second gate driver 220 may apply the gate signal to even-numbered gate lines (G2, G4, . . . ). In addition, in a subsequent frame, the first gate driver 210 may apply the gate signal of the gate-on voltage to the even-numbered gate lines (G2, G4, . . . ), and the second gate driver 220 may apply the gate signal to the odd-numbered gate lines (G1, G3, . . . ). Accordingly, the gate signal may be applied to the odd-numbered gate lines (G1, G3, . . . ) in a direction proceeding from the first gate driver 210 toward the second gate driver 220 in one frame, and the gate signal may be applied to the odd-numbered gate lines (G1, G3, . . . ) in a direction proceeding from the second gate driver 220 toward the first gate driver 210 in a subsequent frame. In addition, the gate signal may be applied to the even-numbered gate lines (G2, G4, . . . ) in a direction proceeding from the second gate driver 220 toward the first gate driver 210 in one frame, and the gate signal may be applied to the even-numbered gate lines (G2, G4, . . . ) in a direction proceeding from the first gate driver 210 toward the second gate driver 220 in a subsequent frame.

The data driver 300 is connected to the plurality of data lines (D1, D2, D3, D4, . . . ). The data driver 300 selects a data voltage according to the image data signal DAT, and applies the selected data voltage according to the data control signal CONT2 to the plurality of data lines (D1, D2, D3, D4, . . . ).

Hereinafter, the first gate driver 210 and the second gate driver 220 will be described in detail with reference to FIG. 4 and FIG. 5.

Figure 4:
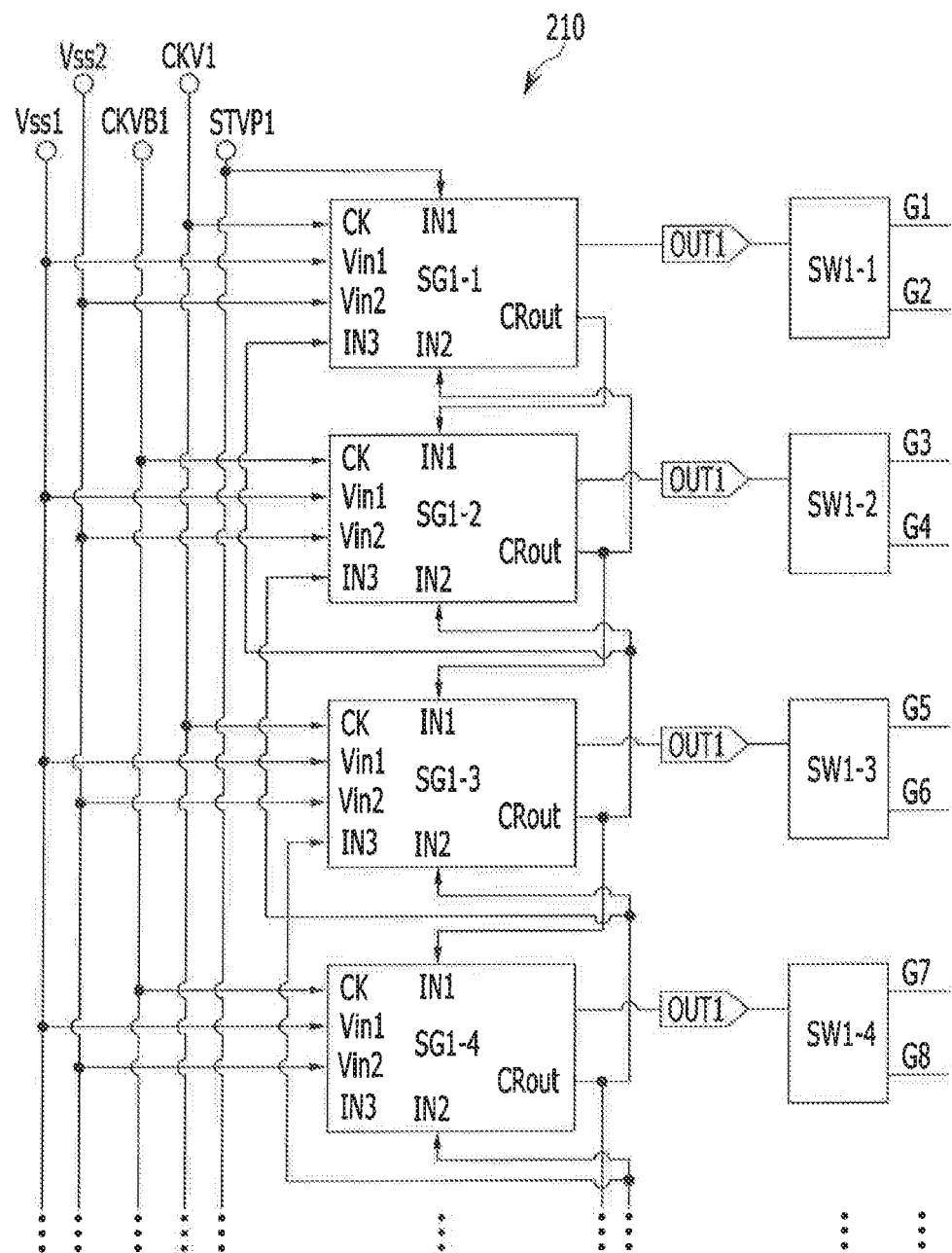
FIG. 4 illustrates a schematic view of a first gate driver included in a display device according to an exemplary embodiment of the present invention.

FIG. 4 illustrates a schematic view of a first gate driver included in a display device according to an exemplary embodiment of the present invention.

Referring to FIG. 4, the first gate driver 210 includes a plurality of first gate signal generating portions (SG1-1, SG1-2, SG1-3, SG1-4, . . . ) and a plurality of first switching portions (SW1-1, SW1-2, SW1-3, SW1-4, . . . ). Each of the plurality of first gate signal generating portions (SG1-1, SG1-2, SG1-3, SG1-4, . . . ) connected to a respective one of the plurality of first switching portions (SW1-1, SW1-2, SW1-3, SW1-4, . . . ) may correspond to one first gate driving block SR1 described in FIG. 1 or FIG. 2.

Each of the plurality of first gate signal generating portions (SG1-1, SG1-2, SG1-3, SG1-4, . . . ) includes three input terminals IN1, IN2, and IN3, a clock input terminal CK, two voltage input terminals Vin1 and Vin2, a first output terminal OUT1, and a transmission signal output terminal CRout.

The first input terminal IN1 is connected to the transmission signal output terminal CRout of the first gate signal generating portion of a previous stage, and a transmission signal of the first gate signal generating portion of the previous stage is inputted to the first input terminal IN1. However, the first gate start signal STVP1 is inputted to the first input terminal IN1 of the first gate signal generating portion (SG1-1).

The second input terminal 1N2 is connected to the transmission signal output terminal CRout of the first gate signal generating portion of a next stage, and a transmission signal of the first gate signal generating portion of the next stage is inputted to the second input terminal 1N2.

The third input terminal 1N3 is connected to the transmission signal output terminal CRout of the first gate signal generating portion two next stages away, and a transmission signal of the first gate signal generating portion of two next stages away is inputted to the third input terminal IN3.

One of a first clock signal CKV1 and a second clock signal CKVB2 is applied to a clock terminal CK. The first clock signal CKV1 is inputted to the clock terminals CK of the odd-numbered first gate signal generating portions (SG1-1, SG1-3, . . . ), and the second clock signal CKVB2 is inputted to the clock terminals CK of the even-numbered first gate signal generating portions (SG1-2, SG1-4, . . . ). The second clock signal CKVB2 may have an opposite phase to that of the first clock signal CKV1.

A first low voltage Vss1 corresponding to a gate-off voltage is applied to a first voltage input terminal Vin1. A second low voltage Vss2 lower than the first low voltage Vss1 is applied to a second voltage input terminal Vin2. Voltages of the first low voltage Vss1 and the second low voltage Vss2 may be variously set according to exemplary embodiments of the present invention. For example, the first low voltage Vss1 may be −5 V, and the second low voltage Vss2 may be −10 V.

The first gate signal generating portion (SG1-1) positioned in a first row receives the first clock signal CKV1 through the clock input terminal CK, receives the first gate start signal STVP1 through the first input terminal IN1, receives the first low voltage Vss1 and the second low voltage Vss2 through the first voltage input terminal Vin1 and the second voltage input terminal Vin2, respectively, and receives the transmission signals of the first gate signal generating portion (SG1-2) positioned in a second row and the first gate signal generating portion (SG1-3) positioned in a third row through the second input terminal IN2 and the third input terminal IN3, respectively. The first gate signal generating portion (SG1-1) outputs the gate signal of the gate-on voltage to the first output terminal OUT1 based on the signals input thereto. The gate signal of the gate-on voltage outputted from the first output terminal OUT1, as described in FIG. 1 and FIG. 2, may be applied to a first gate line G1 or a second gate line G2 through the first switching portion (SW1-1). In addition, the first gate signal generating portion (SG1-1) outputs the transmission signal through the transmission signal output terminal CRout, and then, transmits it to the first input terminal IN1 of the first gate signal generating portion (SG1-2).

The first gate signal generating portion (SG1-2) receives the second clock signal CKVB2 through the clock input terminal CK, receives the transmission signal of the first gate signal generating portion (SG1-1) through the first input terminal IN1, receives the first low voltage Vss1 and the second low voltage Vss2 through the first voltage input terminal Vin1 and the second voltage input terminal Vin2, respectively, and receives the transmission signals of the first gate signal generating portion (SG1-3) and the first gate signal generating portion (SG1-4) through the second input terminal IN2 and the third input terminal IN3, respectively. The first gate signal generating portion (SG1-2) outputs the gate signal of the gate-on voltage to the first output terminal OUT1 based on the signals output thereto. The gate signal of the gate-on voltage outputted from the first output terminal OUT1, as described in FIG. 1 and FIG. 2, may be applied to a third gate line (33 or a fourth gate line G4 through the first switching portion (SW1-2). In addition, the first gate signal generating portion (SG1-2) outputs the transmission signal through the transmission signal output terminal CRout, and then, transmits it the first input terminal IN1 of the first gate signal generating portion (SG1-3).

The first gate signal generating portion (SG1-3) receives the first clock signal CKV1 through the clock input terminal CK, receives the transmission signal of the first gate signal generating portion (SG1-2) through the first input terminal IN1, receives the first low voltage Vss1 and the second low voltage Vss2 through the first voltage input terminal Vin1 and the second voltage input terminal Vin2, respectively, and receives the transmission signals of the first gate signal generating portion (SG1-4) and a first gate signal generating portion positioned in a fifth row through the second input terminal IN2 and the third input terminal IN3, respectively. The first gate signal generating portion (SG1-3) outputs the gate signal of the gate-on voltage to the first output terminal OUT1 based on the signals input thereto. The gate signal of the gate-on voltage outputted from the first output terminal OUT1, as described in FIG. 1 and FIG. 2, may be applied to a fifth gate line G5 or a sixth gate line G6 through the first switching portion (SW1-3). In addition, the first gate signal generating portion (SG1-3) outputs the transmission signal through the transmission signal output terminal CRout, and then, transmits it to the first input terminal IN1 of the first gate signal generating portion (SG1-4).

As described above, the first gate signals of the gate-on voltage provided to the first gate signal generating portion positioned in a last row may be sequentially generated, and the first gate signals of the gate-on voltage may be sequentially applied to the odd-numbered gate lines (G1, G3, G5, G7, . . . ) or the even-numbered gate lines (G2, G4, G6, G8, . . . ) through the plurality of first switching portions (SW1-1, SW1-2, SW1-3, SW1-4, . . . ).

Figure 5:
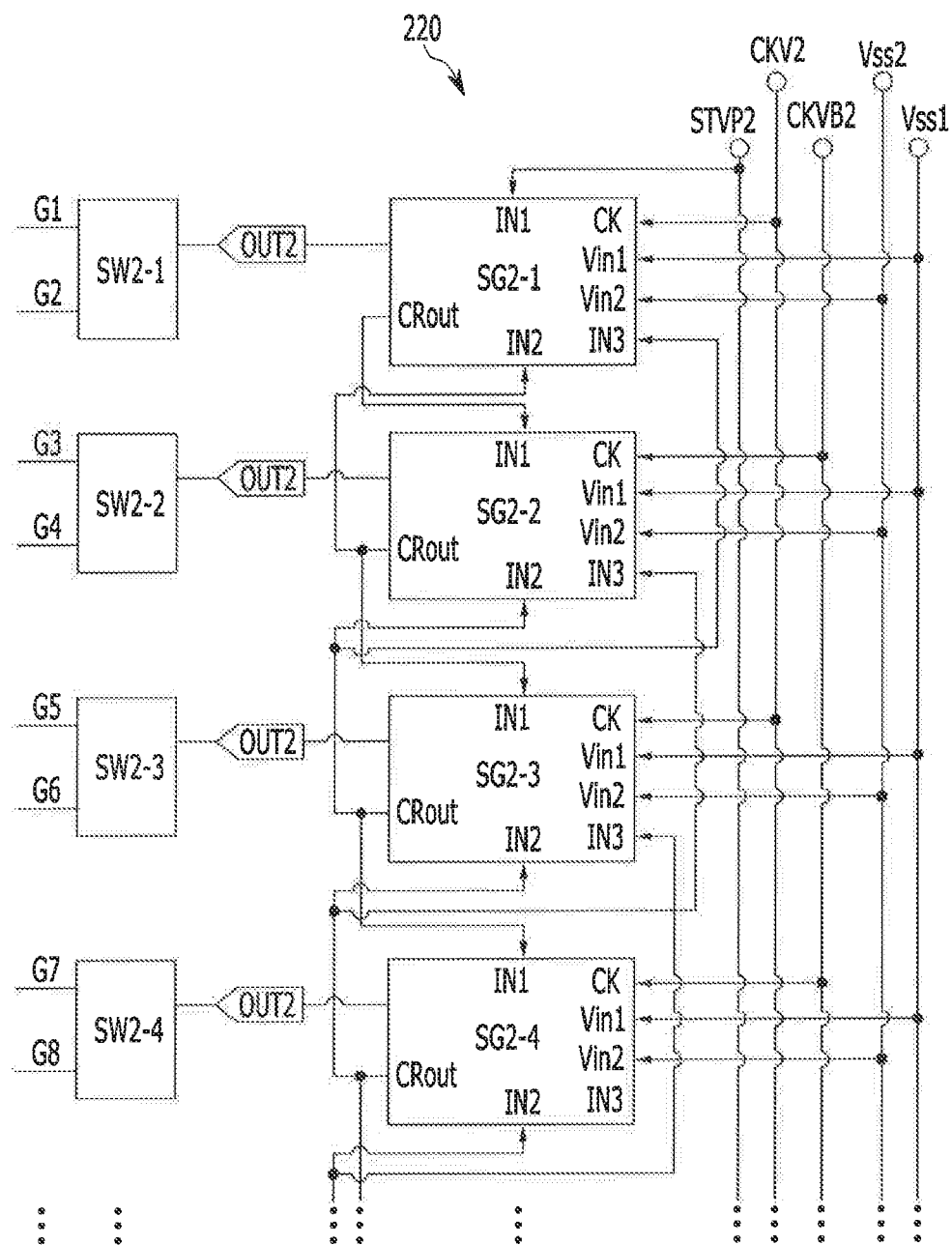
FIG. 5 illustrates a schematic view of a second gate driver included in a display device according to an exemplary embodiment of the present invention.

FIG. 5 illustrates a schematic view of a second gate driver included in a display device according to an exemplary embodiment of the present invention. Compared with FIG. 4, differences will be mainly described.

Referring to FIG. 5, the second gate driver 220 includes a plurality of second gate signal generating portions (SG2-1, SG2-2, SG2-3, SG2-4, . . . ) and a plurality of second switching portions (SW2-1, SW2-2, SW2-3, SW2-4, . . . ). Each of the plurality of second gate signal generating portions (SG2-1, SG2-2, SG2-3, SG2-4, . . . ) connected to a respective one of the plurality of second switching portions (SW2-1, SW2-2, SW2-3, SW2-4, . . . ) may correspond to one second gate driving block SR2 described in FIG. 1 or FIG. 2.

A difference from FIG. 4 is that a third clock signal CKV2 is inputted to the clock terminals CK of the odd-numbered second gate signal generating portions (SG2-1, SG2-3, . . . ), and a fourth clock signal CKVB2 is inputted to the clock terminals CK of the even-numbered second gate signal generating portions (SG2-2, SG2-4, . . . ). The fourth clock signal CKVB2 may have an opposite phase to that of the third clock signal CKV2. A second gate start signal STVP2 is inputted to the first input terminal IN1 of the second gate signal generating portion (SG2-1). The second gate start signal STVP2 may be delayed and outputted by one delay time (referred to as "dt" in FIG. 7) from the first gate start signal STVP1 for each frame. Additionally, the first gate start signal STVP1 may be delayed and outputted by one delay time from the second gate start signal STVP2 for each frame.

Except for the above-described difference, the configuration of the second gate driver 220 is substantially the same as that of the first gate driver 210 of FIG. 4, and thus, a detailed description thereof will be omitted.

Hereinafter, the gate signal generating portions SG1 and SG2 will be described with reference to FIG. 6.

Figure 6:
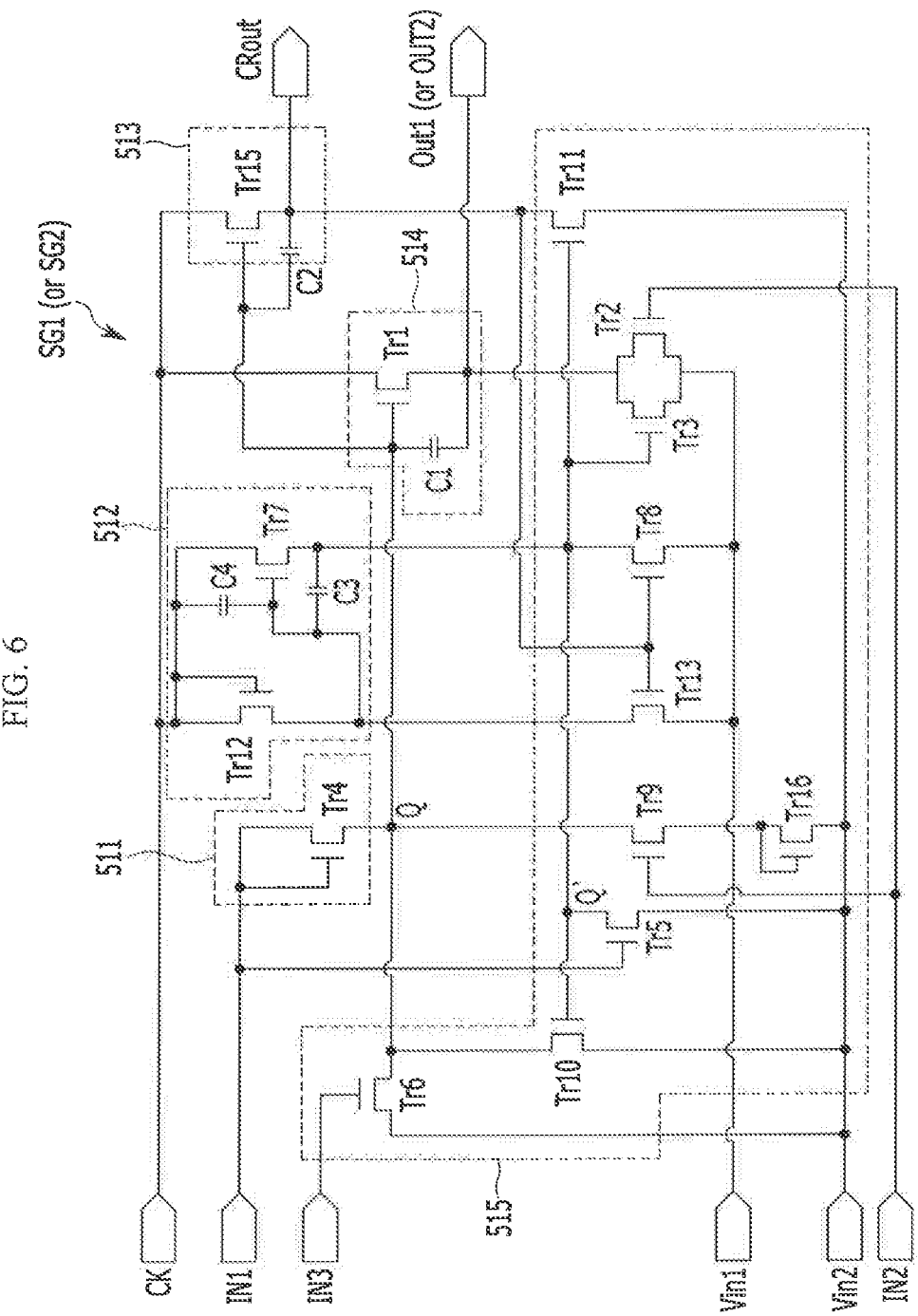
FIG. 6 illustrates a schematic view of a gate signal generating portion according to an exemplary embodiment of the present invention.

FIG. 6 illustrates a schematic view of a gate signal generating portion according to an exemplary embodiment of the present invention. The gate signal generating portion may correspond to the first gate signal generating portion SG1 included in the first gate driving block SR1 or the second gate signal generating portion SG2 included in the second gate driving block SR2. In FIG. 6, the first gate driving block SR1 will be exemplarily described.

Referring to FIG. 6, the first gate signal generating portion SG1 or the second gate signal generating portion SG2 includes an input portion 511, a pull-up driver 512, a transmission signal generating portion 513, an output portion 514, and a pull-down driver 515.

The input portion 511 includes one transistor (for example, a fourth transistor Tr4). The fourth transistor Tr4 includes a gate electrode connected to the first input terminal IN1, a first electrode connected to the first input terminal IN1, and a second electrode connected to a first node Q. The input portion 511 transmits a high level voltage inputted to the first input terminal IN1 to the first node Q.

The pull-up driver 512 includes two transistors (for example, a seventh transistor Tr7 and a twelfth transistor Tr12) and two capacitors (for example, a third capacitor C3 and a fourth capacitor C4).

The twelfth transistor Tr12 includes a gate electrode connected to the clock terminal CK, a first electrode connected to the clock terminal CK, and a second electrode connected to a gate electrode of the seventh transistor Tr7. The second electrode of the twelfth transistor Tr12 is connected to the pull-down driver 515.

The seventh transistor Tr7 includes a gate electrode connected to the second electrode of the twelfth transistor Tr12, a first electrode connected to the clock terminal CK, and a second electrode connected to a second node Q'. The twelfth transistor Tr12 may receive the first clock signal CKV1 or the second clock signal CKVB2 through the clock terminal CK. The second electrode of the seventh transistor Tr7 is connected to the pull-down driver 515 through the second node Q'.

The third capacitor C3 includes a first electrode connected to the gate electrode of the seventh transistor Tr7, and a second electrode connected to the second electrode of the seventh transistor Tr7. The fourth capacitor C4 includes a first electrode connected to the gate electrode of the seventh transistor Tr7 and a second electrode connected to the first electrode of the seventh transistor Tr7. The third capacitor C3 may be a parasitic capacitor between the gate electrode and the second electrode of the seventh transistor Tr7. The fourth capacitor C4 may be a parasitic capacitor between the gate electrode and the first electrode of the seventh transistor Tr7.

When a clock signal of a high level is applied to the clock terminal CK, the clock signal of the high level is transmitted to the gate electrode of the seventh transistor Tr7 and the pull-down driver 515 through the twelfth transistor Tr12. The clock signal of the high level transmitted to the seventh transistor Tr7 turns on the seventh transistor Tr7, and the clock signal of the high level is applied to the second node Q'.

The transmission signal generating portion 513 includes one transistor (e.g., a fifteenth transistor Tr15) and one capacitor (e.g., a second capacitor C2). The fifteenth transistor Tr15 includes a gate electrode connected to the first node Q, a first electrode connected to the clock terminal CK, and a second electrode connected to the transmission signal output terminal CRout. The second capacitor C2 includes a first electrode connected to the gate electrode of the fifteenth transistor Tr15 and a second electrode connected to the second electrode of the fifteenth transistor Tr15. The second capacitor C2 may be a parasitic capacitor between the gate electrode and the second electrode of the fifteenth transistor Tr15. The second electrode of the fifteenth transistor Tr15 is connected to the transmission signal output terminal CRout and to the second voltage input terminal Vin2 connected to the pull-down driver 515 to be able to receive the second low voltage Vss2. The second low voltage Vss2 may be outputted as a low level of the transmission signal outputted to the transmission signal output terminal CRout.

The output portion 514 includes one transistor (e.g., a first transistor Tr1) and one capacitor (e.g., a first capacitor C1). The first transistor Tr1 includes a gate electrode connected to the first node Q, a first electrode connected to the clock terminal CK, and a second electrode connected to the first output terminal OUT1 or the second output terminal OUT2. The first capacitor C1 includes a first electrode connected to the gate electrode of the first transistor Tr1, and a second electrode connected to the first output terminal OUT1 or the second output terminal OUT2.

The first transistor Tr1 receives the first clock signal CKV1 or the second clock signal CKVB2 through the clock terminal CK, and then, transmits it to the first output terminal OUT1. The first clock signal CKV1 or the second clock signal CKVB2 received through the clock terminal CK may be outputted as a gate signal through the first output terminal OUT1 or the second output terminal OUT2. The second electrode and the first output terminal OUT1 of the first transistor Tr1 are connected to the first voltage input terminal Vin1 connected to the pull-down driver 515 to be able to receive the first low voltage Vss1. The first low voltage Vss1 may be outputted as a low level voltage of the gate signal through the first output terminal OUT1 or the second output terminal OUT2. As such, the output portion 514 may output a gate signal according to a voltage of the first node Q and a clock signal received through the clock terminal CK.

The pull-down driver 515 is configured for a gate-off voltage of the gate signal and a low level voltage of the transmission signal to be smoothly outputted by removing electrical charges existing in the first gate signal generating portion SG1 or the second gate signal generating portion SG2. The pull-down driver 515 can reduce a voltage of the first node Q, reduce a voltage of the second node Q', reduce a voltage of the transmission signal, and reduce a voltage of the gate signal outputted through the first output terminal OUT1 or the second output terminal OUT2.

The pull-down driver 515 includes ten transistors (e.g., a second transistor Tr2, a third transistor Tr3, a fifth transistor Tr5, a sixth transistor Tr6, an eighth transistor Tr8, a ninth transistor Tr9, a tenth transistor Tr10, an eleventh transistor Tr11, a thirteenth transistor Tr13, and a sixteenth transistor Tr16).

First, transistors for pulling down the first node Q will be described. The transistors for pulling down the first node Q include the sixth transistor Tr6, the ninth transistor Tr9, the tenth transistor Tr10, and the sixteenth transistor Tr16.

The sixth transistor Tr6 includes a gate electrode connected to the third input terminal IN3, a first electrode connected to the second voltage input terminal Vin2, and a second electrode connected to the first node Q. The sixth transistor Tr6 is turned on by a transmission signal applied from a gate signal generating portion of two next stages through the third input terminal IN3, and reduces a voltage of the first node Q to become the second low voltage Vss2.

The ninth transistor Tr9 includes a gate electrode connected to the second input terminal IN2, a first electrode connected to the second electrode of the sixteenth transistor Tr16, and a second electrode connected to the first node Q. The sixteenth transistor Tr16 includes a gate electrode connected to the first electrode of the ninth transistor Tr9, a first electrode connected to the second voltage input terminal Vin2, and a second electrode connected to the first electrode of the ninth transistor Tr9. The ninth transistor Tr9 and the sixteenth transistor Tr16 operate together to pull down the first node Q. The ninth transistor Tr9 and the sixteenth transistor Tr16 are turned on by a transmission signal applied from a gate signal generating portion of a next stage through the second input terminal IN2, and reduce a voltage of the first node Q to become the second low voltage Vss2.

The tenth transistor Tr10 includes a gate electrode connected to the second node Q', a first electrode connected to the second voltage input terminal Vin2, and a second electrode connected to the first node Q. The tenth transistor Tr10 continuously reduces a voltage of the first node Q to become the second low voltage Vss2 when a voltage of the second node Q' has a high level. The tenth transistor Tr10 does not reduce the voltage of the first node Q when the voltage of the second node Q' is a low level. When the voltage of the first node Q is not reduced, a corresponding first gate signal generating portion SG1 (or a corresponding second gate signal generating portion SG2) outputs the gate signal of the gate-on voltage and the transmission signal.

Hereinafter, transistors for pulling down the second node Q' in the pull-down driver 515 will be described. The transistors for pulling down the second node Q' include the fifth transistor Tr5, the eighth transistor Tr8, and the thirteenth transistor Tr13.

The fifth transistor Tr5 includes a gate electrode connected to the first input terminal IN1, a first electrode connected to the second voltage input terminal Vin2, and a second electrode connected to the second node Q'. The fifth transistor Tr5 is turned on by a transmission signal of a gate signal generating portion of a previous stage received through the first input terminal IN1, and reduces a voltage of the second node Q' to become the second low voltage Vss2.

The eighth transistor Tr8 includes a gate electrode connected to the transmission signal output terminal CRout, a first electrode connected to the first voltage input terminal Vin1, and a second electrode connected to the second node Q'. The eighth transistor Tr8 is turned on by a transmission signal outputted to the transmission signal output terminal CRout, and reduces a voltage of the second node Q' to become the second low voltage Vss2.

The thirteenth transistor Tr13 includes a gate electrode connected to the transmission signal output terminal CRout, a first electrode connected to the first voltage input terminal Vin1, and a second electrode connected to the second electrode of the twelfth transistor Tr12 of the pull-up driver 512. The thirteenth transistor Tr13 is turned on by a transmission signal outputted to the transmission signal output terminal CRout, and the thirteenth transistor Tr13 reduces a potential voltage inside the pull-up driver 512 to become the second low voltage Vss2, and reduces a voltage of the second node Q' connected to the pull-up driver 512 to become the second low voltage Vss2. In other words, although the thirteenth transistor Tr13 discharges electrical charges inside the pull-up driver 512 to the second low voltage Vss2, since the pull-up driver 512 is also connected to the second node Q', the voltage of the second node Q' is not pulled up, thereby indirectly reducing the voltage of the second node Q' to become the second low voltage Vss2.

Hereinafter, a transistor for reducing a voltage outputted as a transmission signal in the pull-down driver 515 will be described. The transistor for reducing the voltage outputted as the transmission signal includes the eleventh transistor Tr11.

The eleventh transistor Tr11 includes a gate electrode connected to the second node Q', a first electrode connected to the second voltage input terminal Vin2, and a second electrode connected to the transmission signal output terminal CRout. The eleventh transistor Tr11, when a voltage of the second node Q' is a high level, reduces a voltage of the transmission signal output terminal CRout to become the second low voltage Vss2. When the voltage of the second node Q' become a high level by the eleventh transistor Tr11, the transmission signal is outputted as a low level voltage.

Hereinafter, transistors for reducing a voltage outputted to the first output terminal OUT1 or the second output terminal OUT2, in other words, the gate line in the pull-down driver 515, will be described. The transistors for reducing a voltage outputted to the gate line include the second transistor Tr2 and the third transistor Tr3.

The second transistor Tr2 includes a gate electrode connected to the second input terminal IN2, a first electrode connected to the first voltage input terminal Vin1, and a second electrode connected to the first output terminal OUT1 or the second output terminal OUT2. The second transistor Tr2 is turned on by a transmission signal of a gate signal generating portion of a next stage received through the second input terminal 1N2, and changes a voltage level of a gate signal outputted to the first output terminal OUT1 or the second output terminal OUT2 to be the first low voltage Vss1.

The third transistor Tr3 includes a gate electrode connected to the second node Q', a first electrode connected to the first voltage input terminal Vin1, and a second electrode connected to the first output terminal OUT1 or the second output terminal OUT2. The third transistor Tr3 is turned on by a voltage of the second node Q', and changes a voltage level of a gate signal outputted to the first output terminal OUT1 or the second output terminal OUT2 to be the first low voltage Vss1.

The pull-down driver 515 reduces a voltage of the first output terminal OUT1 or the second output terminal OUT2 to become the first low voltage Vss1. Additionally, the pull-down driver 515 reduces voltages of the first node Q, the second node Q', and the transmission signal output terminal CRout to become the second low voltage Vss2 that is lower than the first low voltage Vss1. Accordingly, even if the gate-on voltage of the gate signal and the high level voltage of the transmission signal are the same, the gate-off voltage of the gate signal and the low level voltage of the transmission signal are different. In other words, the gate-off voltage of the gate signal corresponds to the first low voltage Vss1, and the low level voltage of the transmission signal corresponds to the second low voltage Vss2.

The gate signal and the transmission signal may be various voltages. In the present exemplary embodiment, the gate-on voltage of the gate signal may be about 25 V, the gate-off voltage of the gate signal and the first low voltage Vss1 may be about −5 V, the high level voltage of the transmission signal may be about 25 V, and the low level voltage of the transmission signal and the second low voltage Vss2 may be about −10 V.

Hereinafter, a driving method of a display device will be described with reference to FIG. 7 together with FIG. 3 to FIG. 6.

Figure 7:
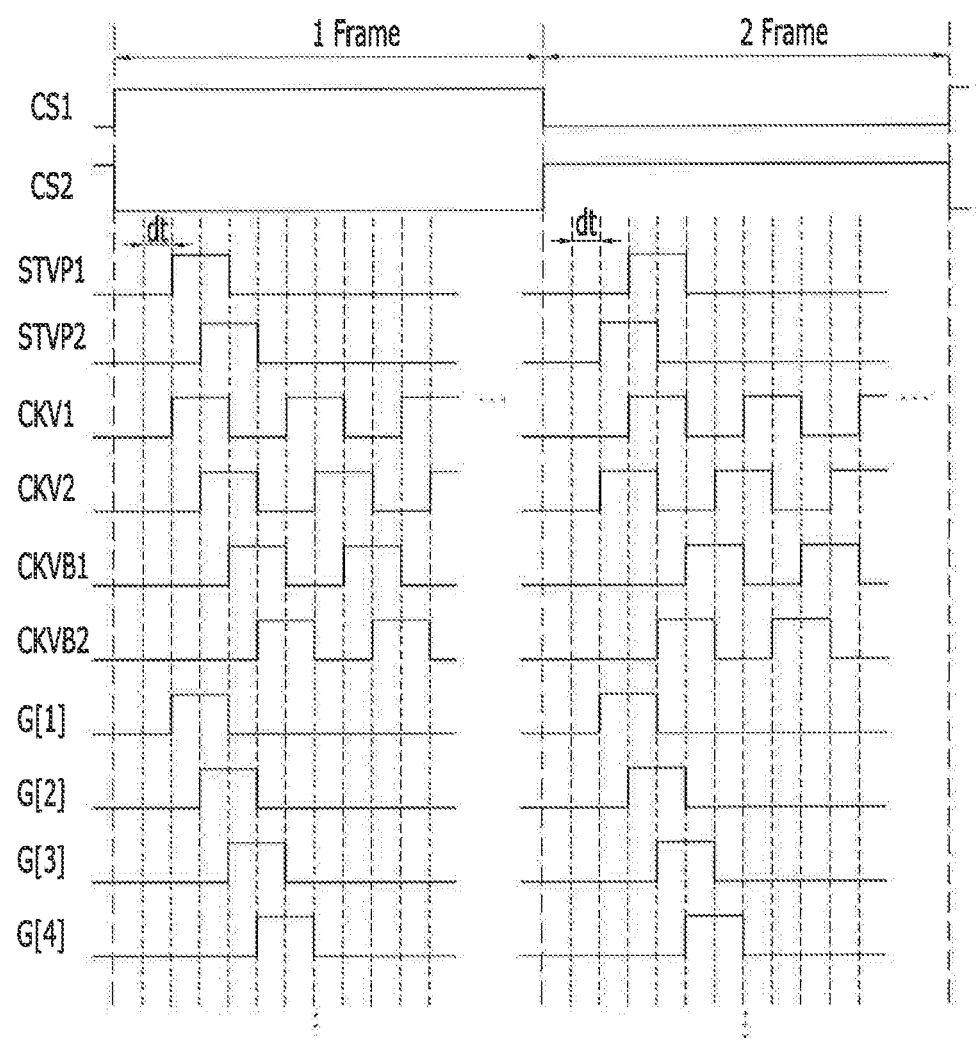
FIG. 7 illustrates a timing chart of a driving method of a display device according to an exemplary embodiment of the present invention.

FIG. 7 illustrates a timing chart of a driving method of a display device according to an exemplary embodiment of the present invention.

Referring to FIG. 3 to FIG. 7, the first gate start signal STVP1 and the first clock signal CKV1 are inputted to the first gate signal generating portion (SG1-1) of the first gate driver 210, and the second gate start signal STVP2 and the third clock signal CKV2 are inputted to the second gate signal generating portion (SG2-1) of the second gate driver 220. In other words, the first gate driver 210 is synchronized with the first gate start signal STVP1 and the first clock signal CKV1 to start the output of the gate signal, and the second gate driver 220 is synchronized with the second gate start signal STVP2 and the third clock signal CKV2 to start the output of the gate signal.

In this case, the output timings of the first clock signal CKV1 and the third clock signal CKV2 are changed for each frame, and correspondingly, the output timings of the first gate start signal STVP1 and the second gate start signal STVP2 are changed for each frame. Since the second clock signal CKVB1 corresponds to an opposite phase signal to that of the first clock signal CKV1, similar to the first clock signal CKV1, the output timing of the second clock signal CKVB1 is also changed for each frame. In addition, since the fourth clock signal CKVB2 corresponds to an opposite phase signal to that of the third clock signal CKV2, similar to the third clock signal CKV2, the output timing of the fourth clock signal CKVB2 is also changed for each frame. The output timings of the first clock signal CKV1, the second clock signal CKVB1, the third clock signal CKV2, the fourth clock signal CKVB2, the first gate start signal STVP1, and the second gate start signal STVP2 may be controlled by the timing controller 100. The timing controller 100 may change the output timings of the first clock signal CKV1, the second clock signal CKVB1, the third clock signal CKV2, the fourth clock signal CKVB2, the first gate start signal STVP1, and the second gate start signal STVP2, and simultaneously, the timing controller 100 may change and output the voltage levels of the first switching signal CS1 and the second switching signal CS2 for each frame.

For example, the timing controller 100 may delay and output the third clock signal CKV2 by a predetermined delay time (dt) from the first clock signal CKV1 in a first frame (1 frame), may delay and output the second gate start signal STVP2 by the predetermined delay time (dt) from the first gate start signal STVP1, and may output the first switching signal CS1 as a high level voltage. In the exemplary embodiment of the present invention shown in FIG. 2, the timing controller 100 may output the first switching signal CS1 as a high level voltage, and may output the second switching signal CS2 as a low level voltage. The delay time (dt) may correspond to about half of an interval in which the first clock signal CKV1 is applied as a high level voltage or a low level voltage. Additionally, the delay time (dt) may correspond to about half of an interval in which the third clock signal CKV2 is applied as a high level voltage or a low level voltage.

The timing controller 100 may delay and output the first clock signal CKV1 by the delay time (dt) from the third clock signal CKV2 in a second frame (2 frame) after the first frame (1 frame), may delay and output the first gate start signal STVP1 by the delay time (dt) from the second gate start signal STVP2, and may output the first switching signal CS1 as a low level voltage. In the exemplary embodiment of the present invention shown in FIG. 2, the timing controller 100 may output the first switching signal CS1 as a low level voltage, and may output the second switching signal CS2 as a high level voltage.

As such, the timing controller 100 may repeatedly change the output timings of the first clock signal CKV1, the second clock signal CKVB1, the third clock signal CKV2, the fourth clock signal CKVB2, the first gate start signal STVP1, and the second gate start signal STVP2 for each frame. Additionally, the timing controller 100 may repeatedly change the voltage levels of the first switching signal CS1 and the second switching signal CS2 for each frame.

Accordingly, in the first frame (1 Frame), the first gate signal outputted from the first gate driver 210 may be sequentially applied to the odd-numbered gate lines (G1, G3, G5, G7, . . . ), and the second gate signal outputted from the second gate driver 220 may be sequentially applied to the even-numbered gate lines (G2, G4, G6, G8, . . . ). The gate signal outputted from the first gate driver 210 may be referred to as the first gate signal, and the gate signal outputted from the second gate driver 220 may be referred to as the second gate signal. In other words, in the first frame (1 Frame), the first gate signal (G[1]) applied to the first gate line G1 and the first gate signal (G[3]) applied to the third gate line G3 are the gate signals outputted from the first gate driver 210. The gate signal (G[2]) applied to the second gate line G2 and the second gate signal (G[4]) applied to the fourth gate line G4 are the gate signals outputted from the second gate driver 220.

Since there is a difference of the delay time (dt) between the first clock signal CKV1 and the third clock signal CKV2, after the first gate signal (G[1]) is applied to the first gate line G1, the second gate signal (G[2]) is applied to the second gate line G2, after the second gate signal (G[2]) is applied to the second gate line G2, the first gate signal (G[3]) is applied to the third gate line G3, and after the first gate signal (G[3]) is applied to the third gate line G3, the second gate signal (G[4]) is applied to the fourth gate line G4. In this manner, the first gate signal and the second gate signal may be sequentially applied to the plurality of gate lines (G1, G2, G3, G4, G5, G6, G7, G8, . . . ).

In the second frame (2 Frame), the second gate signal outputted from the second gate driver 220 may be sequentially applied to the odd-numbered gate lines (G1, G3, G5, G7, . . . ), and the first gate signal outputted from the first gate driver 210 may be sequentially applied to the even-numbered gate lines (G2, G4, G6, G8, . . . ). After the second gate signal (G[1]) is applied to the first gate line G1, the first gate signal (G[2]) is applied to the second gate line G2, after the first gate signal (G[2]) is applied to the second gate line G2, the second gate signal (G[3]) is applied to the third gate line G3, and after the second gate signal (G[3]) is applied to the third gate line G3, the first gate signal (G[4]) is applied to the fourth gate line G4. In this manner, the second gate signal and the first gate signal may be sequentially applied to the plurality of gate lines (G1, G2, G3, G4, G5, G6, G7, G8, . . . ). An interval in which the first gate signal outputted from the first gate driver 210 is applied to the plurality of gate lines (G1, G2, G3, G4, G5, G6, G7, G8, . . . ) and an interval in which the second gate signal outputted from the second gate driver 220 is applied to the plurality of gate lines (G1, G2, G3, 04, G5, G6, G7, G8, . . . ) may overlap each other with a difference of the delay time (dt).

As such, a direction of the gate signal applied to the plurality of gate lines (G1, G2, G3, G4, G5, G6, G7, G8, . . . ) may be changed for each frame. Accordingly, the plurality of pixels PX may have an average constant charge rate regardless of a position of the pixels PX. For example, if a pixel PX is adjacent to the second gate driver 220, although a voltage level of the gate signal outputted from the first gate driver 210 is reduced due to self-resistance of the gate line in one frame such that the charge rate of the pixel PX decreases, the gate signal outputted from the second gate driver 220 is received in a subsequent frame, and thus, the charge rate of the pixel PX may increase. Accordingly, regardless of the position of a pixel PX, it is possible to obtain an average constant charge rate.

Hereinafter, a method in which the timing controller 100 generates the first switching signal CS1 and the second switching signal CS2 will be described with reference to FIG. 8 and FIG. 9. In FIG. 1, when only the first switching signal CS1 is used, the timing controller 100 may generate and output only the first switching signal CS1. As in FIG. 2, an exemplary embodiment of the present invention using both the first switching signal CS1 and the second switching signal CS2 will be described in reference to FIG. 8 and FIG. 9.

Figure 8:
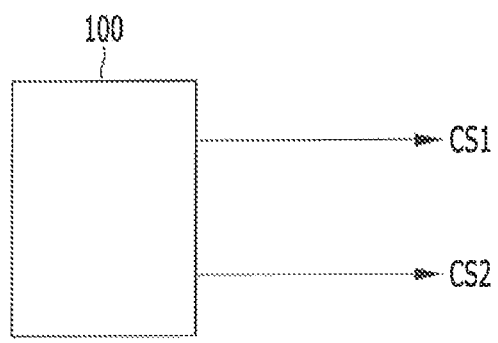
FIG. 8 illustrates a schematic view of a method for generating a first switching signal and a second switching signal according to an exemplary embodiment of the present invention.

FIG. 8 illustrates a schematic view of a method for generating a first switching signal and a second switching signal according to an exemplary embodiment of the present invention.

Referring to FIG. 8, the timing controller 100 may output the first switching signal CS1 and the second switching signal CS2 through different output lines. In this case, the timing controller 100 generates the second switching signal CS2 to have a voltage level of an opposite phase to that of the first switching signal CS1.

Figure 9:
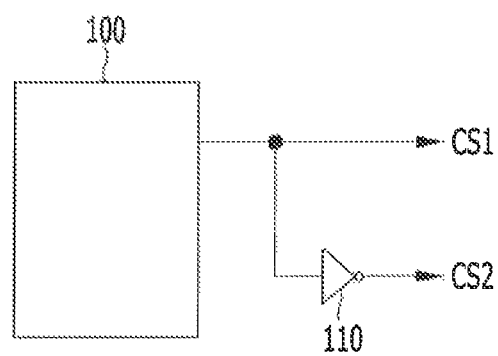
FIG. 9 illustrates a schematic view of a method for generating a first switching signal and a second switching signal according to an exemplary embodiment of the present invention.

FIG. 9 illustrates a schematic view of a method for generating a first switching signal and a second switching signal according to an exemplary embodiment of the present invention.

Referring to FIG. 9, the timing controller 100 may generate and output the first switching signal CS1, and may generate the second switching signal CS2 by connecting a logic circuit 110 to the output line of the first switching signal CS1. The logic circuit 110 generates the second switching signal CS2 to have the opposite phase compared to that of the first switching signal CS1. The logic circuit 110 may be a NOT gate.

An exemplary embodiment of the present invention provides a display device that may control a direction in which gate signals are applied to a plurality of gate lines. For example, according to an exemplary embodiment of the present invention, it is possible to change the direction in which the gate signals are applied to the plurality of gate lines, for each frame. Accordingly, a charge rate of pixels in a display device may not vary, thereby increasing the image quality of the display device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising: a display unit including a plurality of pixels;
    a plurality of gate lines configured to be connected to the plurality of pixels;
    a first gate driver configured to be connected to the plurality of gate lines; and
    a second gate driver configured to be connected to the plurality of gate lines connected to the first gate driver,
    wherein the first gate driver applies a first gate signal to odd-numbered gate lines of the plurality of gate lines according to a first clock signal and a second clock signal in a first frame, and applies the first gate signal to even-numbered gate lines of the plurality of gate lines according to the first dock signal and the second dock signal in a second frame after the first frame,
    the second gate driver applies a second gate signal to the even-numbered gate lines according to a third clock signal and a fourth clock signal in the first frame, and applies the second gate signal to the odd-numbered gate lines according to the third dock signal and the fourth dock signal in the second frame,
    the third dock signal is delayed from the first dock signal and the fourth dock signal is delayed from the second dock signal in the first-frame, and
    the first dock signal is delayed from the third dock signal and the second dock signal is delayed from the fourth dock signal in the second-frame.

2. The display device of claim 1, wherein the display unit is disposed between the first gate driver and the second gate driver.

3. The display device of claim 1, wherein the first gate signal and the second gate signal are alternately applied to the plurality of gate lines.

4. The display device of claim 1, wherein an interval in which the first gate signal is applied to the plurality of gate lines and an interval in which the second gate signal is applied to the plurality of gate lines overlap each other after a predetermined delay time.

5. The display device of claim 1, further comprising:
    a plurality of data lines configured to be connected to the plurality of pixels,
    wherein two of the plurality of gate lines are arranged in each pixel row, a first data line of the plurality of data lines is connected to a first two pixel pair in a first pixel column, and a second data line of the plurality of data lines is connected to a second two pixel pair in the first pixel column, wherein the first and second two pixel pairs axe positioned in adjacent pixel rows.

6. A display device, comprising:
    a first gate driving block configured to be connected to first and second gate lines;
    a second gate driving block configured to be connected to the first and second gate lines, wherein the second gate driving block is separated from the first gate driving block by a plurality of pixels,
    wherein a first gate signal applied to the first gate line is applied in a direction from the first gate driving block to the second gate driving block for a first frame, and a third gate signal applied to the first gate line is applied in a direction from the second gate driving block to the first gate driving block for a second frame subsequent to the first frame,
    wherein the first gate driving block includes a first gate signal generating portion for outputting the first gate signal to the first gate line through a turned-on first switching, transistor for the first frame,
    wherein the first gate signal generating portion outputs a second gate signal to the second gate line through a turned-on second switching transistor for the second frame, and
    wherein the first switching transistor is directly connected to the first gate line and the second switching transistor is directly connected to the second gate line,
    wherein the second gate driving block includes a second grate signal generating portion for outputting a fourth gate signal to the second gate line through a turned-on fourth switching transistor directly connected to the second gate line for the first frame, wherein, during the first frame, the first gate driving block is synchronized with a first clock signal to apply the first gate signal and the second gate driving block is synchronized with a second clock signal delayed from the first clock signal to apply the fourth gate signal and, during the second frame, the second gate driving block is synchronized with a third clock signal to apply the third gate signal and the first gate driving block is synchronized with a fourth clock signal delayed from the third dock signal to apply the second gate signal, such that the first gate line is applied with its gate signals before the second gate line for each of the first and second frames.

7. The display device of claim 6, wherein the second gate signal generating portion outputs the third gate signal to the first gate line through a turned-on third switching transistor directly connected to the first gate line for the second frame.

* * * * *